(12) United States Patent
King

(10) Patent No.: US 6,608,647 B1
(45) Date of Patent: Aug. 19, 2003

(54) METHODS AND APPARATUS FOR CHARGE COUPLED DEVICE IMAGE ACQUISITION WITH INDEPENDENT INTEGRATION AND READOUT

(75) Inventor: David R. King, Norfolk, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/087,592

(22) Filed: May 29, 1998

Related U.S. Application Data

(60) Provisional application No. 60/050,597, filed on Jun. 24, 1997.

(51) Int. Cl.[7] ............................. H04N 3/14; H04N 5/232
(52) U.S. Cl. ............................. 348/211.14; 348/222.1; 348/257; 348/296; 348/312
(58) Field of Search ........................... 348/14.01, 14.02, 348/14.08, 14.09, 207, 211–213, 222, 218, 311, 312, 552, 207.1, 207.11, 211.99, 211.1–211.14, 222.1, 218.1, 257, 317; 257/231, 232, 236

(56) References Cited

U.S. PATENT DOCUMENTS

| | | |
|---|---|---|
| 3,816,722 A | 6/1974 | Sakoe et al. |
| 3,936,800 A | 2/1976 | Ejiri et al. |
| 3,967,100 A | 6/1976 | Shimomura |
| 3,968,475 A | 7/1976 | McMahon |
| 3,978,326 A | 8/1976 | Shimomura |
| 4,011,403 A | 3/1977 | Epstein et al. |
| 4,115,702 A | 9/1978 | Nopper |
| 4,115,762 A | 9/1978 | Akiyama et al. |
| 4,183,013 A | 1/1980 | Agrawala et al. |
| 4,200,861 A | 4/1980 | Hubach et al. |
| 4,254,400 A | 3/1981 | Yoda et al. |
| 4,286,293 A | 8/1981 | Jablonowski |
| 4,300,164 A | 11/1981 | Sacks |
| 4,385,322 A | 5/1983 | Hubach et al. |
| 4,435,837 A | 3/1984 | Abernathy |
| 4,441,124 A | 4/1984 | Heebner et al. |
| 4,441,206 A | 4/1984 | Kuniyoshi et al. |
| 4,519,041 A | 5/1985 | Fant et al. |
| 4,534,813 A | 8/1985 | Williamson et al. |
| 4,541,116 A | 9/1985 | Lougheed |
| 4,570,180 A | 2/1986 | Baier et al. |
| 4,577,344 A | 3/1986 | Warren et al. |
| 4,581,762 A | 4/1986 | Lapidus et al. |
| 4,606,065 A | 8/1986 | Beg et al. |
| 4,617,619 A | 10/1986 | Gehly |

(List continued on next page.)

FOREIGN PATENT DOCUMENTS

| | | |
|---|---|---|
| EP | 0265302 | 4/1888 |
| EP | 0341122 | 11/1989 |
| EP | 0 527 632 A2 | 2/1993 |

(List continued on next page.)

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

(List continued on next page.)

*Primary Examiner*—Ngoc-Yen Vu
(74) *Attorney, Agent, or Firm*—David J. Powsner

(57) ABSTRACT

Methods and apparatus for image acquisition utilize a charge coupled device having a photosensitive region that responds to an applied transfer signal by transferring charge accumulated on the collection sites to the corresponding readout sites. The non-photosensitive region responds to a read signal, applied independently of the transfer signal, by outputting (e.g., to the host camera or image acquisition system) charges on the readout sites. The methods and apparatus take advantage of the inherent storage capability of the non-photosensitive sites by using them to hold image information pending application of the readout signal, thereby, conserving host resources.

35 Claims, 8 Drawing Sheets

U.S. PATENT DOCUMENTS

| | | |
|---|---|---|
| 4,630,306 A | 12/1986 | West et al. |
| 4,641,349 A | 2/1987 | Flom et al. |
| 4,688,088 A | 8/1987 | Hamazaki et al. |
| 4,706,168 A | 11/1987 | Weisner |
| 4,707,647 A | 11/1987 | Coldren et al. |
| 4,728,195 A | 3/1988 | Silver |
| 4,730,260 A | 3/1988 | Mori et al. |
| 4,731,858 A | 3/1988 | Grasmueller et al. |
| 4,736,437 A | 4/1988 | Sacks et al. |
| 4,742,551 A | 5/1988 | Deering |
| 4,752,898 A | 6/1988 | Koenig |
| 4,758,782 A | 7/1988 | Kobayashi |
| 4,764,870 A | 8/1988 | Haskin |
| 4,771,469 A | 9/1988 | Wittenburg |
| 4,776,027 A | 10/1988 | Hisano et al. |
| 4,782,238 A | 11/1988 | Radl et al. |
| 4,783,826 A | 11/1988 | Koso |
| 4,783,828 A | 11/1988 | Sadjadi |
| 4,783,829 A | 11/1988 | Miyakawa et al. |
| 4,809,077 A | 2/1989 | Norita et al. |
| 4,831,580 A | 5/1989 | Yamada |
| 4,860,374 A | 8/1989 | Murakami et al. |
| 4,860,375 A | 8/1989 | McCubbrey et al. |
| 4,876,457 A | 10/1989 | Bose |
| 4,876,728 A | 10/1989 | Roth |
| 4,891,767 A | 1/1990 | Rzasa et al. |
| 4,903,218 A | 2/1990 | Longo et al. |
| 4,907,169 A | 3/1990 | Lovoi |
| 4,912,559 A | 3/1990 | Ariyoshi et al. |
| 4,914,553 A | 4/1990 | Hamada et al. |
| 4,922,543 A | 5/1990 | Ahlbom et al. |
| 4,926,492 A | 5/1990 | Tanaka et al. |
| 4,932,065 A | 6/1990 | Feldgajer |
| 4,953,224 A | 8/1990 | Ichinose et al. |
| 4,955,062 A | 9/1990 | Terui |
| 4,959,898 A | 10/1990 | Landman et al. |
| 4,962,423 A | 10/1990 | Yamada et al. |
| 4,972,359 A | 11/1990 | Silver et al. |
| 4,982,438 A | 1/1991 | Usami et al. |
| 5,012,402 A | 4/1991 | Akiyama |
| 5,012,524 A | 4/1991 | LeBeau |
| 5,027,419 A | 6/1991 | Davis |
| 5,046,190 A | 9/1991 | Daniel et al. |
| 5,054,096 A | 10/1991 | Beizer |
| 5,060,276 A | 10/1991 | Morris et al. |
| 5,063,608 A | 11/1991 | Siegel |
| 5,073,958 A | 12/1991 | Imme |
| 5,081,656 A | 1/1992 | Baker et al. |
| 5,081,689 A | 1/1992 | Meyer et al. |
| 5,086,478 A | 2/1992 | Kelly-Mahaffey et al. |
| 5,090,576 A | 2/1992 | Menten |
| 5,091,861 A | 2/1992 | Geller et al. |
| 5,091,968 A | 2/1992 | Higgins et al. |
| 5,093,867 A | 3/1992 | Hori et al. |
| 5,113,565 A | 5/1992 | Cipolla et al. |
| 5,115,309 A | 5/1992 | Hang |
| 5,119,435 A | 6/1992 | Berkin |
| 5,124,622 A | 6/1992 | Kawamura et al. |
| 5,133,022 A | 7/1992 | Weideman |
| 5,134,575 A | 7/1992 | Takagi |
| 5,143,436 A | 9/1992 | Baylor et al. |
| 5,145,432 A | 9/1992 | Midland et al. |
| 5,151,951 A | 9/1992 | Ueda et al. |
| 5,153,925 A | 10/1992 | Tanioka et al. |
| 5,155,775 A | 10/1992 | Brown |
| 5,159,281 A | 10/1992 | Hedstrom et al. |
| 5,159,645 A | 10/1992 | Kumagai |
| 5,164,994 A | 11/1992 | Bushroe |
| 5,168,269 A | 12/1992 | Harlan |
| 5,179,419 A | 1/1993 | Palmquist et al. |
| 5,185,810 A | 2/1993 | Freischlad |
| 5,185,855 A | 2/1993 | Kato et al. |
| 5,189,712 A | 2/1993 | Kajiwara et al. |
| 5,206,820 A | 4/1993 | Ammann et al. |
| 5,216,503 A | 6/1993 | Paik |
| 5,225,940 A | 7/1993 | Ishii et al. |
| 5,230,027 A | 7/1993 | Kikuchi |
| 5,243,607 A | 9/1993 | Masson et al. |
| 5,253,306 A | 10/1993 | Nishio |
| 5,253,308 A | 10/1993 | Johnson |
| 5,265,173 A | 11/1993 | Griffin et al. |
| 5,271,068 A | 12/1993 | Ueda et al. |
| 5,287,449 A | 2/1994 | Kojima |
| 5,297,238 A | 3/1994 | Wang et al. |
| 5,297,256 A | 3/1994 | Wolstenholme et al. |
| 5,299,269 A | 3/1994 | Gaborski et al. |
| 5,307,419 A | 4/1994 | Tsujino et al. |
| 5,311,598 A | 5/1994 | Bose et al. |
| 5,315,388 A | 5/1994 | Shen et al. |
| 5,319,457 A | 6/1994 | Nakahashi et al. |
| 5,327,156 A | 7/1994 | Masukane et al. |
| 5,329,469 A | 7/1994 | Watanabe |
| 5,337,262 A | 8/1994 | Luthi et al. |
| 5,337,267 A | 8/1994 | Colavin |
| 5,363,507 A | 11/1994 | Nakayama et al. |
| 5,367,439 A | 11/1994 | Mayer et al. |
| 5,367,667 A | 11/1994 | Wahlquist et al. |
| 5,371,690 A | 12/1994 | Engel et al. |
| 5,388,197 A | 2/1995 | Rayner |
| 5,388,252 A | 2/1995 | Dreste et al. |
| 5,398,292 A | 3/1995 | Aoyama |
| 5,432,525 A | 7/1995 | Maruo et al. |
| 5,440,699 A | 8/1995 | Farrand et al. |
| 5,455,870 A | 10/1995 | Sepai et al. |
| 5,455,933 A | 10/1995 | Schieve et al. |
| 5,471,312 A | 11/1995 | Watanabe et al. |
| 5,475,766 A | 12/1995 | Tsuchiya et al. |
| 5,477,138 A | 12/1995 | Erjavic et al. |
| 5,481,712 A | 1/1996 | Silver et al. |
| 5,485,570 A | 1/1996 | Busboom et al. |
| 5,491,780 A | 2/1996 | Fyles et al. |
| 5,493,332 A * | 2/1996 | Dalton ...................... 348/207 |
| 5,495,424 A | 2/1996 | Tokura |
| 5,495,537 A | 2/1996 | Bedrosian et al. |
| 5,500,906 A | 3/1996 | Picard et al. |
| 5,506,617 A | 4/1996 | Parulski et al. |
| 5,506,682 A | 4/1996 | Pryor |
| 5,511,015 A | 4/1996 | Flockencier |
| 5,519,840 A | 5/1996 | Matias et al. |
| 5,526,050 A | 6/1996 | King et al. |
| 5,528,703 A | 6/1996 | Lee |
| 5,532,739 A | 7/1996 | Garakani et al. |
| 5,539,409 A | 7/1996 | Mathews et al. |
| 5,544,256 A | 8/1996 | Brecher et al. |
| 5,548,326 A | 8/1996 | Michael |
| 5,550,763 A | 8/1996 | Michael |
| 5,553,859 A | 9/1996 | Kelly et al. |
| 5,557,410 A | 9/1996 | Huber et al. |
| 5,557,690 A | 9/1996 | O'Gorman et al. |
| 5,566,877 A | 10/1996 | McCormack |
| 5,568,563 A | 10/1996 | Tanaka et al. |
| 5,574,668 A | 11/1996 | Beaty |
| 5,574,801 A | 11/1996 | Collet-Beillon |
| 5,581,632 A | 12/1996 | Koljonen et al. |
| 5,583,949 A | 12/1996 | Smith et al. |
| 5,583,954 A | 12/1996 | Garakani |
| 5,586,058 A | 12/1996 | Aloni et al. |
| 5,592,562 A | 1/1997 | Rooks |
| 5,594,859 A | 1/1997 | Palmer et al. |
| 5,602,937 A | 2/1997 | Bedrosian et al. |
| 5,608,490 A | 3/1997 | Ogawa |

| | | |
|---|---|---|
| 5,608,872 A | 3/1997 | Schwartz et al. |
| 5,640,199 A | 6/1997 | Garakani et al. |
| 5,640,200 A | 6/1997 | Michael |
| 5,642,158 A | 6/1997 | Petry, III et al. |
| 5,647,009 A | 7/1997 | Aoki et al. |
| 5,657,403 A | 8/1997 | Wolff et al. |
| 5,673,334 A | 9/1997 | Nichani et al. |
| 5,676,302 A | 10/1997 | Petry, III |
| 5,696,553 A * | 12/1997 | D'Alfonso ................. 348/211 |
| 5,696,848 A | 12/1997 | Patti et al. |
| 5,715,369 A | 2/1998 | Spoltman et al. |
| 5,717,785 A | 2/1998 | Silver |
| 5,724,439 A | 3/1998 | Mizuoka et al. |
| 5,742,037 A | 4/1998 | Scola et al. |
| 5,751,853 A | 5/1998 | Michael |
| 5,754,679 A | 5/1998 | Koljonen et al. |
| 5,757,956 A | 5/1998 | Koljonen et al. |
| 5,760,430 A * | 6/1998 | Kato ......................... 257/236 |
| 5,761,326 A | 6/1998 | Brady et al. |
| 5,768,443 A | 6/1998 | Michael et al. |
| 5,793,899 A | 8/1998 | Wolff et al. |
| 5,796,386 A | 8/1998 | Lipscomb et al. |
| 5,796,868 A | 8/1998 | Dutta-Choudhury |
| 5,801,966 A | 9/1998 | Ohashi |
| 5,805,722 A | 9/1998 | Cullen et al. |
| 5,809,658 A | 9/1998 | Jackson et al. |
| 5,818,443 A | 10/1998 | Schott |
| 5,825,483 A | 10/1998 | Michael et al. |
| 5,825,913 A | 10/1998 | Rostami et al. |
| 5,835,622 A | 11/1998 | Koljonen et al. |
| 5,845,007 A | 12/1998 | Ohashi et al. |
| 5,848,189 A | 12/1998 | Pearson et al. |
| 5,850,466 A | 12/1998 | Schott |
| 5,859,923 A | 1/1999 | Petry, III et al. |
| 5,861,909 A | 1/1999 | Garakani et al. |
| 5,872,870 A | 2/1999 | Michael |
| 5,878,152 A | 3/1999 | Sussman |
| 5,900,975 A | 5/1999 | Sussman |
| 5,901,241 A | 5/1999 | Koljonen et al. |
| 5,909,504 A | 6/1999 | Whitman |
| 5,912,768 A | 6/1999 | Sissom et al. |
| 5,912,984 A | 6/1999 | Michael et al. |
| 5,918,196 A | 6/1999 | Jacobson |
| 5,933,523 A | 8/1999 | Drisko et al. |
| 5,943,441 A | 8/1999 | Michael |
| 6,046,769 A * | 4/2000 | Ikeda ......................... 348/222 |
| 6,144,407 A * | 11/2000 | Mizutani .................... 348/220 |
| 6,288,742 B1 * | 9/2001 | Ansari ........................ 348/212 |
| 6,351,284 B1 * | 2/2002 | Watanabe .................. 348/312 |

FOREIGN PATENT DOCUMENTS

| | | |
|---|---|---|
| EP | 0 777 381 A2 | 11/1996 |
| FR | 2598019 | 10/1987 |
| WO | WO 95/21376 | 8/1995 |
| WO | WO 95/22137 | 8/1995 |
| WO | WO 97/21189 | 6/1997 |
| WO | WO 97/22858 | 6/1997 |
| WO | WO 97/24692 | 7/1997 |
| WO | WO 97/24693 | 7/1997 |
| WO | WO 98/52349 | 11/1998 |
| WO | WO 98/59490 | 12/1998 |
| WO | WO 99/15864 | 4/1999 |

OTHER PUBLICATIONS

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing for Cost Sensitive Applications," 4 pp. (1993).

PictureTel Corporation Product Brochure, "PictureTel System 4000(tm) A Family of Models to Fit Your Application From Offices to Boardrooms, Classrooms, and Auditoriums," 4 pp. (1993).

Symantec Corporation, "The Norton pcANYWHERE User's Guide," Table of Contents 8 pp; Introduction of pcANYWHERE Technology pp i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Gevorkian David Z., Astola Jaakko T., and Atourian Samvel M. "Improving Gil–Werman Algorithm for Running Min and Max Filters" IEEE Transactions on Pattern Analysis and Machine Intelligence, vol. 19, No. 5, May 1997, pp. 526–529.

Gil, Joseph and Werman Michael, "Computing 2–D Min, Median, and Max Filters" IEEE Transactions on Pattern Analysis and Machine Intelligence, vol. 15, No. 5, May 1993, pp. 504–507.

Chapter 3: "Guidelines for Developing MMX Code," Intel.

Chapter 4: "MMX Code Development Strategy," Intel.

Chapter 5: "MMX Coding Techniques," Intel.

Chapter 3: "Optimization Techniques for Integer Blended Code," Intel.

Rosenfeld, Azriel. "Computer Vision: Basic Principles," Proceedings of the IEEE. vol. 76, No. 8, Aug. 1988. pp. 863–868.

High –speed video analysis system using multiple shuttered charge–coupled device imagers and digital storage Authors: Roberto G. Racca, Owen Stephenson, and Reginald M. Clements, Optical Engineering, Jun. 1992, vol. 31 No. 6.

* cited by examiner

METHODS AND APPARATUS FOR CHARGE COUPLED DEVICE IMAGE ACQUISITION WITH INDEPENDENT INTEGRATION AND READOUT

This application claims the benefit of priority of U.S. Provisional Patent Application Ser. No. 60/050,597, filed Jun. 24, 1997, the teachings of which are incorporated herein by reference and a copy of which is attached hereto as Appendix A.

BACKGROUND OF THE INVENTION

The invention pertains to image acquisition and, particularly, to the control and readout of images using charge coupled devices. The invention has application in video cameras and other image acquisition devices used in machine vision and in other industrial, research and recreational environments.

Manufacturers of video cameras and other digital image acquisition devices are increasingly reliant on charge coupled devices (CCD's) to capture images for real-time processing. These devices are made up of hundreds or thousands of microscopic semiconductor elements arranged in closely spaced arrays. When the array is exposed to light (or other radiation), each of its constituent elements accumulate an electronic charge proportional to the number of photons that strike it. By focusing a scene on such an array, an electronic image is formed with brighter regions of the scene corresponding to more highly charged elements and darker regions corresponding to less highly charged ones.

Typically, only one-half of the elements in a CCD array are used to collect light. In one prior art design, referred to as the interline transfer CCD, rows (or columns) of photosensitive elements are alternated with rows (or columns) of non-sensitive elements. The latter serve as "conduits" to transfer the electronic charges from the photosensitive elements to an output buffer, or readout register.

The acquisition of an image in a typical CCD array occurs over several phases. To begin, the photosensitive elements are grounded or "reset" to remove all previously accumulated charge. Once this is completed, light (or other energy) from a lens begins to accumulate, forming an image. Since CCD devices are not typically equipped with mechanical shutters, accumulation continues until the charges built-up in each of the photosensitive elements are transferred to the corresponding non-photosensitive elements. The period following the reset and before the transfer is, accordingly, referred to as the integration or shuttering period.

According to prior art image acquisition system designs, once the integration period ends, the charges transferred to the non-photosensitive elements are immediately and quickly shifted across (or down) each row (or column) of non-photosensitive elements to the readout register. From there, they are loaded into to the memory of the host device (e.g., video workstation) into which the CCD has been incorporated.

Another type of prior art CCD array, the full frame CCD, is configured differently from the interline CCD, but is operated similarly. Rather than having interleaved rows of photosensitive and non-photosensitive elements, the photosensitive elements are disposed together on one-half of the array; the latter, on the other half. Once the integration period ends, the charges accumulated in the photosensitive elements are shifted from neighbor to neighbor until they occupy corresponding elements on the non-photosensitive half, whence they are transferred via the readout array to the host memory.

Regardless of which prior art CCD design is used, prior art image acquisition system designs require that memory be dedicated in the host device to receive the image data as it streams from the readout register. Sufficient bandwidth must also be provided on the bus or other communications path to insure that the streaming data is not lost en route to the memory. Still further, because the CCD devices typically operate with their own internal clocks, the host must be designed to accommodate asynchronous transfers from the readout register.

For example, conventional machine vision systems using a CCD camera based upon one of the popular video standards (i.e. RS170 or CCIR) have no control over when the image data is output by the CCD's, since they are constantly outputting new video information after each vertical blanking interval. In applications that use electronic shuttering, on the other hand, the host must be ready to accept the video information immediately following the termination of the integration period, since there exists no mechanism which would allow the readout of the data to be postponed.

An object of this invention is to provide improved methods and apparatus for image acquisition and, more particularly, improved methods and apparatus using charge coupled devices to acquire images.

Another object is to provide such methods and apparatus as reduce the resources required for, and costs associated with, image acquisition.

Still another object of the invention is to provide such devices and methods as permit greater control of image acquisition.

Yet still another object of the invention is to provide such methods and apparatus as are adapted to use in multicamera environments, e.g., where multiple images must be acquired synchronously or asynchronously.

SUMMARY OF THE INVENTION

The foregoing are among the objects attained by the invention, which provides methods and apparatus for image acquisition that take advantage of the inherent storage capability of charge coupled device (CCD) devices. By separating the integration and readout functions of such devices, the invention permits image acquisition apparatus (e.g., video camera) or systems into which they are incorporated (e.g., machine vision systems) to control the flow of image information, e.g., to reduce the bus and memory resources required to carry it, to time its arrival with other information or images, and/or to coordinate its arrival with the availability of processing resources.

Thus, in one aspect, the invention utilizes a charge coupled device that includes a photosensitive region, with photosensitive charge collection sites, and a non-photosensitive region, with non-photosensitive readout sites. The readout sites are coupled directly (e.g., as in an interline format) or indirectly (e.g., as in a frame transfer format) to the charge collection sites. The photosensitive region responds to an applied transfer signal by transferring charge accumulated on the collection sites to the corresponding readout sites. The non-photosensitive region responds to a read signal, applied independently of the transfer signal, by outputting (e.g., to a host camera or image acquisition system) charges in the readout sites.

Unlike prior art acquisition devices, in which initiation of a transfer cycle leads directly to the output of image information from the readout sites, an acquisition device according to the invention executes transfer and readout functions independently. Thus, although the transfer and readout signals may be applied substantially simultaneously (thus, emulating prior art systems), they need not be. By delaying application of the readout signal, image information in the readout sites can be retained until the host is ready to receive it.

The apparatus further includes a control unit that responds to requests, e.g., from a host system, by generating and applying to a head unit signals for acquiring an image. The head unit responds to those signals by acquiring image information output from the CCD and generating a video signal for application to the control unit and/or the host.

Related aspects of the invention provide an image acquisition apparatus as described above in which the acquisition signal generated by the control unit include a shutter pulse that defines at least a duration of charge integration by the CCD, and a readout signal that causes charges on the CCD readout sites to be outputted, e.g., to the head unit. The head unit can respond to such a shutter pulse by applying to the CCD a reset signal that clears its charge collection sites. The head unit can subsequently apply a transfer signal to the charge collection sites, causing them to transfer their charge to the readout sites. Application of the transfer signal can be timed to effect an integration period in accord with that defined by the shutter pulse. The head unit can respond to a readout signal from the control unit by applying to the CCD a read signal that causes the charges to be transferred from the non-photosensitive sites to a readout register, buffer or other store.

Still further aspects of the invention provide an image acquisition apparatus as described above in which multiple head units are provided, each associated with a respective CCD. The control unit of such can apparatus can effect synchronous image acquisition from those head units by applying shutter pulses substantially concurrently to them. Alternatively, the images can be acquired asynchronously via application of shutter pulses at different times. Whether image acquisition is synchronous or asynchronous, the control unit can control image transfer from the head units by applying readout signals to them independently of the application of the shutter pulses. Thus, for example, in response to requests from the host, the control unit can cause images acquired simultaneously by multiple head units to be output to the host memory in any desired order.

In still further aspects, the invention provides methods for image acquisition paralleling operation of the devices and apparatus described above.

Systems in accord with the invention have a many advantages over the prior art. By taking advantage of the inherent storage capability of CCD readout sites and separating their integration functions from the readout functions, the invention provides greater control of, and reduces the resources required for, the image acquisition process. In machine vision, for example, such systems are well suited to those applications which require that the acquisition of images overlap the inspection process. Here, inspection of an image can be completed without diverting processor resources (e.g., memory and bus cycles) to acquisition of a subsequent image. Instead, the host can instruct the control unit simply to acquire the subsequent image and to defer resource-consuming transfers until processing of the prior image is completed.

Moreover, in applications requiring acquisition of multiple images, systems according to the invention can utilize a single video path (e.g. amplifiers, D.C. restoration circuits, anti-aliasing filters, A/D converters) efficiently among multiple head units. For example, a control unit can apply integration pulse signals simultaneously to the multiple head units, yet, apply the readout signals serially so that only a single video path is required to condition the resultant image signals for transfer to the host. This contrasts with prior art image acquisition technology, which would require a unique datapath for each camera head unit.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

With reference to FIG. 11a, there is shown a CCD 10 of the type used to practice the invention configured in accord with the interline format. The CCD 10 alternates columns of photosensitive charge collection sites 12 (also referred to as picture elements or pixels) with columns of non-photosensitive (i.e. protected) readout sites 14. In the illustrated embodiment, each charge collection site is coupled to a corresponding (and, typically, adjacent) non-photosensitive photosensitive site in the conventional manner.

Though there is a one-to-one correspondence between photosensitive and non-photosensitive photosensitive sites in the illustrated embodiment, other embodiments of the invention may employ other relationships (e.g., four photosensitive sites to one non-photosensitive site, and so forth). The non-photosensitive sites are, moreover, coupled to one another in the conventional manner that permits charge to be output to a readout register 16 and, from there, to other components of the image acquisition system.

Figure 1A:
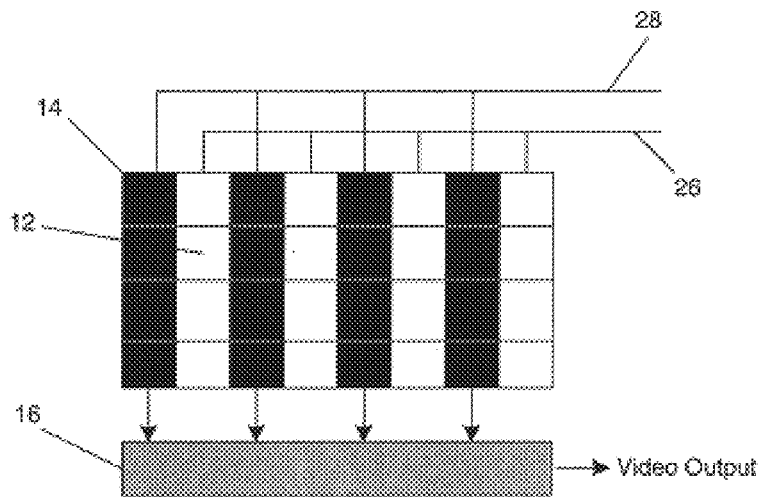
FIGS. 1a–1b depict charge coupled devices (CCDs) of the type used in practice of the invention.
Figure 1B:
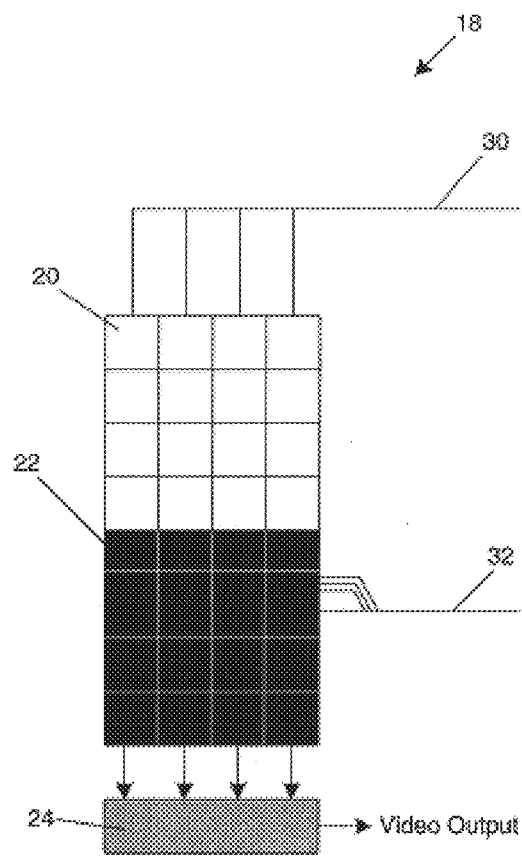

With reference to FIG. 1b, a CCD 18 of the type used to practice the invention configured in accord with the frame transfer format does not interleave the charge collection 20 and readout sites 22 but, rather, places them on two distinct halves of the device. In this embodiment, the photosensitive and non-photosensitive sites are coupled to one another in the conventional manner (i.e., with some photosensitive sites being coupled indirectly via other photosensitive sites to non-photosensitive sites) in order to permit charge collected in the former to be moved to the latter and, thereafter, to the readout register 24.

In order to produce an image, the CCD's 10, 18 employ three basic cycles. The first, the reset cycle, is used to clear any residual charges from the photosensitive areas, effectively forcing the pixels to black. The next step, the transfer cycle (commonly referred to as the charge transfer interval), moves the charges accumulated since the most recent reset cycle into the non-photosensitive readout sites. Since the amount of charge accumulated is proportional to the length of time between the reset and transfer cycles, the difference (in time) between these two constitutes an electronic shutter mechanism.

The final step, the readout cycle, is used to move or output the charges to the Camera Head Unit, which combines them with timing information to form an image signal for application to the Camera Control Unit (CCU). This step, requiring a vertical transfer clock sequence, involves moving an entire line of pixels from their protected cells into the readout register. Once there, the pixels are then shifted out serially using a series of horizontal transfer clock cycles at a rate dictated by the Camera Head Unit's (CHU's) internal clock rate. The total number of horizontal clock cycles per line and vertical clock cycles per frame is dictated by the number of rows and columns contained within the CCD.

In the CCD of FIG. 1a, the transfer cycle is initiated over line 26 which is coupled to the photosensitive sites 12 (and other elements of CCD 10) in a conventional manner such that application of a transfer signal causes charges accumulated on sites 12 to be transferred to the non-photosensitive sites 14. A readout cycle is likewise initiated by a line 28 such that application of a readout signal causes charges stored on sites 14 to be transferred to the readout register 16. Referring to FIG. 1b, CCD 18 is similarly equipped with lines 30, 32 that carry signals for initiating transfer and readout cycles for that device.

The reset cycle of CCD's 10 and 18 can be initiated over further lines (not illustrated) or, preferably, over lines 26, 30, in a conventional manner. Thus, for example, CCD 10 can be arranged such that a reset signal applied to such a line causes any charges accumulated in the photosensitive elements 12 to be cleared.

Unlike a prior art image acquisition system, in which initiation of a transfer cycle leads directly to transfer to the readout register of charges accumulated on photosensitive sites, the illustrated embodiment permits the transfer and readout function to be executed independently. Thus, although the transfer and read signal may be sent at substantially the same times or in quick succession (thus, emulating prior art system), they need not be. By delaying the read signal, the illustrated embodiment permits the accumulated charges (i.e., the image) to be retained in the non-photosensitive sites, e.g., rather than in readout register 18 or other memory of the acquisition system or its host.

Figure 2:
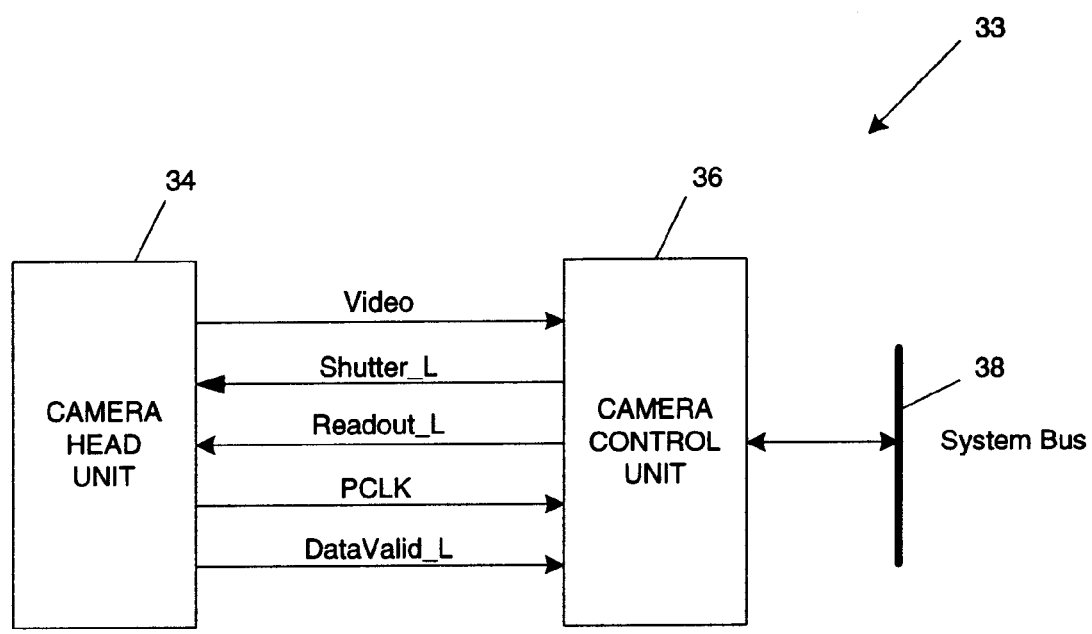
FIG. 2 depicts an image acquisition apparatus according to the invention having a single camera head unit.

FIG. 2 illustrates a video camera or other such single head image acquisition system 33 according to the invention. The system includes Camera Head Unit (CHU) 34 and associated Camera Control Unit (CCU) 36. The system 33 and, specifically, the CCU 36 communicates with a host computer, or other control apparatus (not shown), via a System Bus 38. A lens, through which scenes are focussed on the CCD, is not shown.

The Camera Control Unit 36 services requests for new images by processing commands received from the host (e.g., a host digital data processing system) over the System Bus 38 and, in turn, issues the Shutter_L and Readout_L pulses to the CHU 34, as illustrated. The Shutter_L pulse is used to control the integration time of the Camera Head Unit (CHU). It includes two parts, a first that causes the photosensitive sites in the CCD to clear (or reset) so that acquisition of a new image can begin, and a second that causes image-representative charges on those sites to be transferred to the non-photosensitive sites. The Readout_L signal initiates the readout cycle.

The CHU 34, which includes a CCD, e.g., of the type shown in FIGS. 1A or 1B, responds to the applied Shutter_L and Readout_L signals for acquiring an image and transmitting it back to the CCU 36, as indicated by the image signal labeled "video." Along with the image signal, the CHU 34 returns a clocking signal, PCLCK, that indicates the timing of the video signal and a data valid signal, DATA VALID_L, identifying that portion of the video signal containing valid image data.

Figure 3:
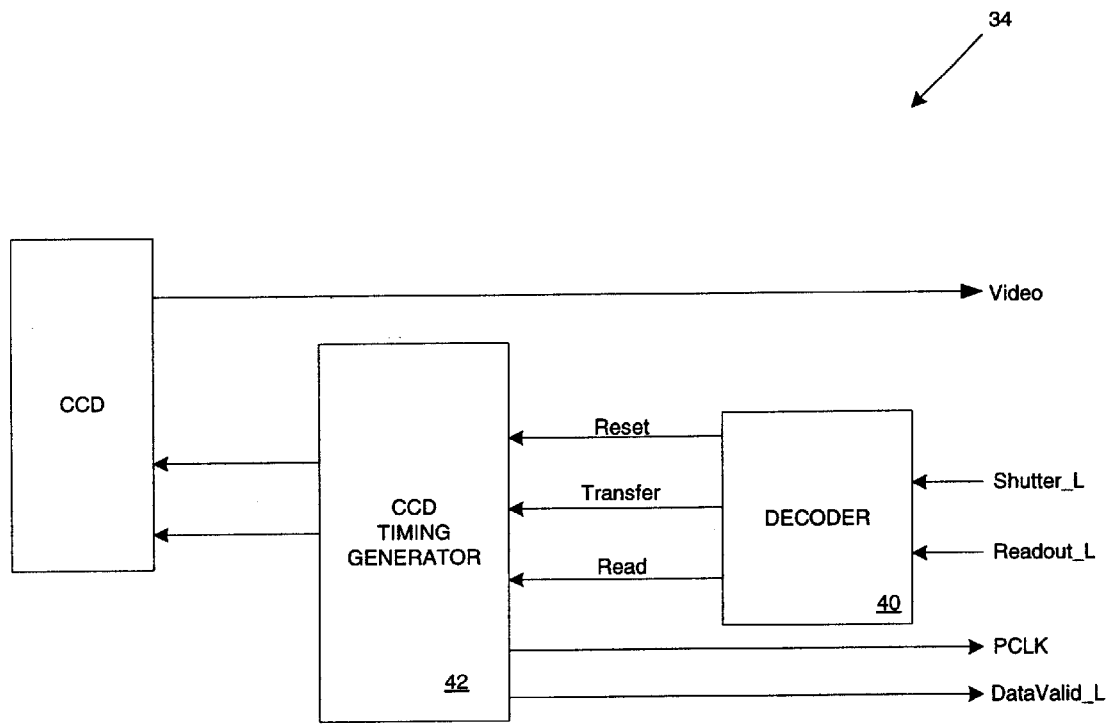
FIG. 3 depicts a camera head unit utilized in an image acquisition apparatus according to the invention.

A detailed block diagram of Camera Head Unit (CHU) 34 is illustrated in FIG. 3. As shown there, a Decoder 40 is used to synchronize the Shutter_L and Readout_L signals with the Camera Head Unit's 34 internal clocking and to generate a pulse to the CCD Timing Generator 42 to initiate each of the CCD clock cycles required to create an image and transfer it to the Camera Control Unit (CCU) 36.

More particularly, in response to an applied Shutter_L signal, the Decoder 40 generates a Reset pulse instructing the CCD Timing Generator 42 to clear the photo-sensitive areas of the CCD, via application of a Reset signal, in preparation for a new integration cycle. In accord with the pulse width of the Shutter_L signal, the Decoder 40 subsequently generates a transfer pulse informing the CCD Timing Generator 42 that the integration cycle has expired and that the charge currently residing in the photo-sensitive areas of the sensor needs to be moved into the non-photosensitive readout sites, i.e., via application of a transfer signal to the CCD. Moreover, in response to the Readout_L signal, the Decoder 40 applies to the Timing Generator 42 a Read signal indicating that the Camera Control Unit (CCU) 36 is ready to accept the image and that the sequence of vertical and horizontal transfer cycles required to read the contents of the CCD sensor should be executed.

As noted above, in response to the foregoing, the Camera Head Unit (CHU) 34 transfer the CCD-acquired image to the CCU 36 via a video signal (Video), a pixel clock (PCLK), and a data validation signal (Data Valid_L).

Figure 4:
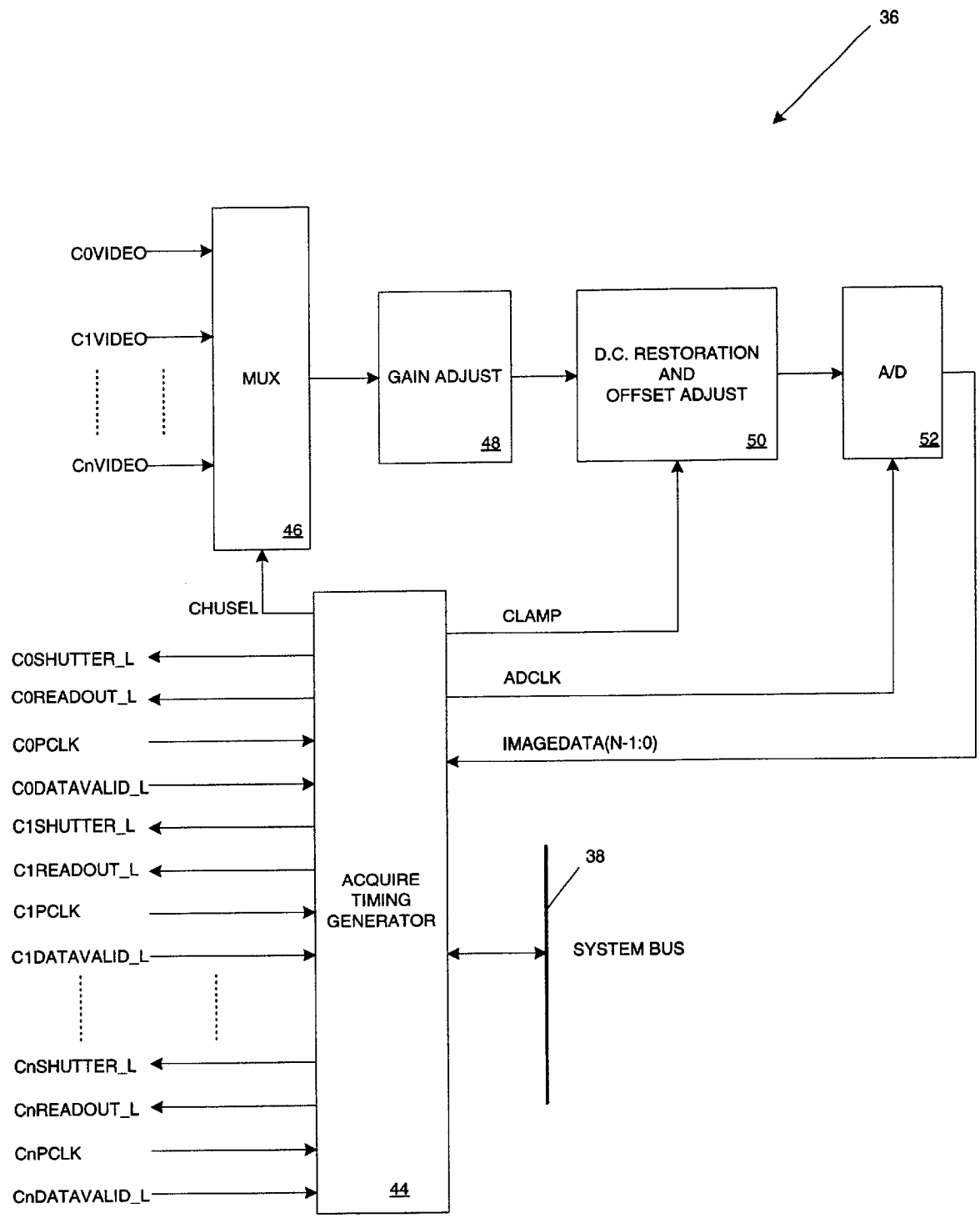
FIG. 4 depicts a camera control unit utilized in an image acquisition apparatus according to the invention.

FIG. 4 illustrates a Camera Control Unit (CCU) 36 that can be used to support a single head image acquisition system of the type shown in FIGS. 2–3, as well as a multihead system of the type described below. In the illustration, an Acquire Timing Generator 44 processes commands received from the host computer (not shown) via the System Bus. Since a single Camera Control Unit (CCU) 36 preferably supports configurations with multiple Camera Head Units (CHUs), a set of shutter (C0 Shutter_L . . . Cn Shutter_L) and readout (C0 Readout_L . . . Cn Readout_L) controls are derived for each potentially installed CHU. Similarly the Acquire Timing Generator 44 accepts the pixel clock (C0 PCLK . . . Cn PCLK), data validation signals (C0 DataValid_L . . . Cn DataValid_L), and video wave forms (C0 Video . . . Cn Video) from each installed CHU.

As shown in the drawing, the CCU 36 includes a video pre-processing circuit comprised of a video multiplexer (Mux) 46 and programmable gain (Gain Adjust) 48. In a preferred embodiment, that gain is set in accord with the ratio of full scale digitizer (A/D) input versus full scale video output from the CHU 34. The programmable gain 48 can also be used to increase the amplitude of the video signal in low light situations where extending the integration time (i.e. the width, in time, of the Cn Shutter_L pulse) is not an option. Those skilled in the art will, of course, appreciate that the gain can be set and utilized in other ways conventional in the art.

A level correction (D.C. Restoration and Offset Adjust) 50 is provided to eliminate any residual offsets from the video signal. In a preferred embodiment, level correction is set at a value determined in accord with calibration or other training parameters, though it can be set in other ways conventional in the art.

The Acquire Timing Generator 44 is responsible for performing D.C. restoration of the video signal. It achieves this by asserting a Clamp signal, as illustrated, at a point in the video signal where it has been pre-determined that a black level should be present. In a preferred embodiment, that pre-determined point is set in accord with signal characteristics of the CHU 34.

The Acquire Timing Generator 44 is also responsible for producing a clock (ADCLK) for the analog to digital convertor (A/D) 52, which samples the video signal at its optimum point to ensure maximum accuracy. In a preferred embodiment, that optimum point is set in accord with signal characteristics of the CHU 42.

Since illustrated Camera Control Unit 36 contains only one video path, the video multiplexer (Mux) 46 is used to select the proper video signal (C0 Video . . . Cn Video). This is controlled by means of the Camera Head Unit select (CHUSEL) signal which emanates from the Acquire Timing Generator 44, as shown. The CHUSEL signal is also used to select the proper set of pixel clock and data validation signals (C0 PCLK . . . Cn PCLK, C0 DataValid_L . . . Cn DataValid_L).

Digitized image data emanating from the A/D converter 52, as represented by signal ImageData(N−1:0), is transferred to the host computer via the System Bus 38 under the control of the Acquire Timing Generator 44.

Figure 5:
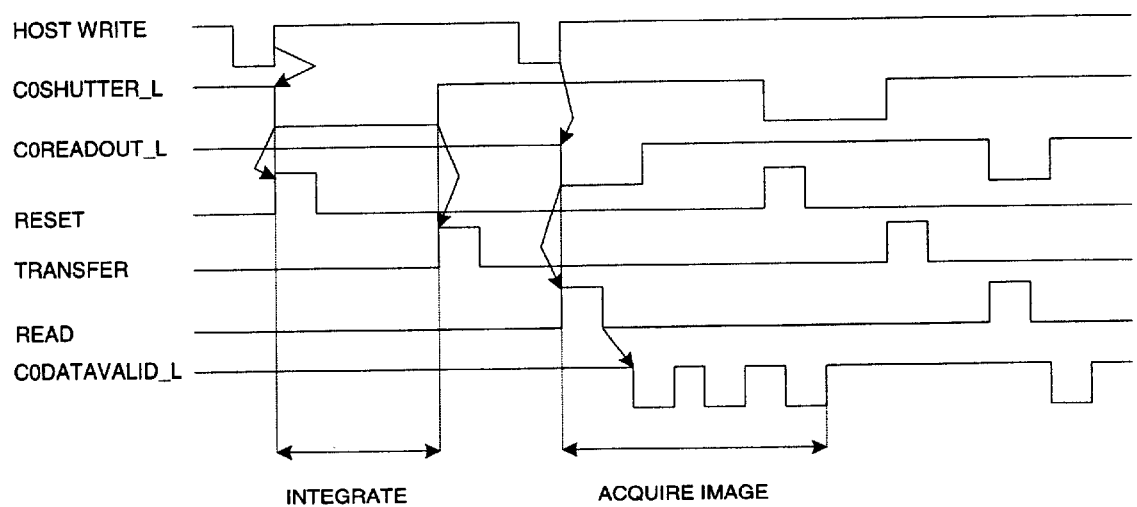
FIG. 5 depicts the timing of signal generation in an image acquisition of the type shown in FIG. 2.

FIG. 5 illustrates the timing sequence for image acquisition in the embodiment shown in FIGS. 2–4 involving only a single Camera Head Unit 34. The host computer (not shown) first initializes the CCU's Acquire Timing generator 44 for the type of acquire (to wit, single CHU), the integration interval. The host computer also selects a Camera Head Unit (CHU) by setting the CHUSEL signal to the appropriate value (e.g. 0 for CHU 0, 1 for CHU 1, and so forth).

When the Acquire Timing Generator 44 receives a start of integration command from the host computer, it immediately asserts the shutter signal (C0 Shutter_L in this example) for the selected Camera Head Unit (CHU). The high to low transition (i.e. leading edge) of the C0 Shutter_L pulse is detected by the Decoder located inside the Camera Head Unit 34 (see FIG. 3) which then asserts the Reset signal. Upon sensing the Reset signal, the CCD Timing Generator 42 executes the CCD sensor clock sequence required to clear out any charge remaining in the photo-sensitive areas of the CCD sensor.

The integration period is terminated by the low to high transition (trailing edge) of the C0 Shutter_L pulse. This edge, when sensed by the Decoder 40, causes it to issue the Transfer pulse which in turn informs the CCD Timing Generator 42 that all of the charge currently residing in the photo-sensitive collection wells needs to be transferred to the corresponding non-photo-sensitive (i.e. protected) readout sites.

Once the charge transfer cycle is complete, the image is ready to be transmitted to the Camera Control Unit (CCU) 36. No further action is taken until the host computer informs the Acquire Timing Generator 44 that it is ready to accept the image. Upon receiving a readout instruction from the host computer, the Acquire Timing Generator 44 asserts the readout signal, C0 Readout_L in this example. The high to low transition (i.e. leading edge) of this signal causes the Decoder 40 circuit inside the Camera Head Unit (CHU) 34 to issue a Read strobe. This pulse causes the CCD Timing Generator 42 to commence the sequence of vertical and horizontal clock cycles required to completely transfer the image residing in the readout cells to the Camera Control Unit (CCU) 36 where it is digitized and passed along to the host computer via the System Bus 38.

The data validation signal (C0 DataValid_L in this example) is issued by the Camera Head Unit (CHU) 34 and is used by the Camera Control Unit 36 to distinguish between valid and invalid portions of the video signal. The pixel clock (C0 PCLK, not shown in this example) ensures that the video signal (C0 Video, not shown in this example) is sampled at its' optimum point to maximize the accuracy of the digitalization process.

Figure 6:
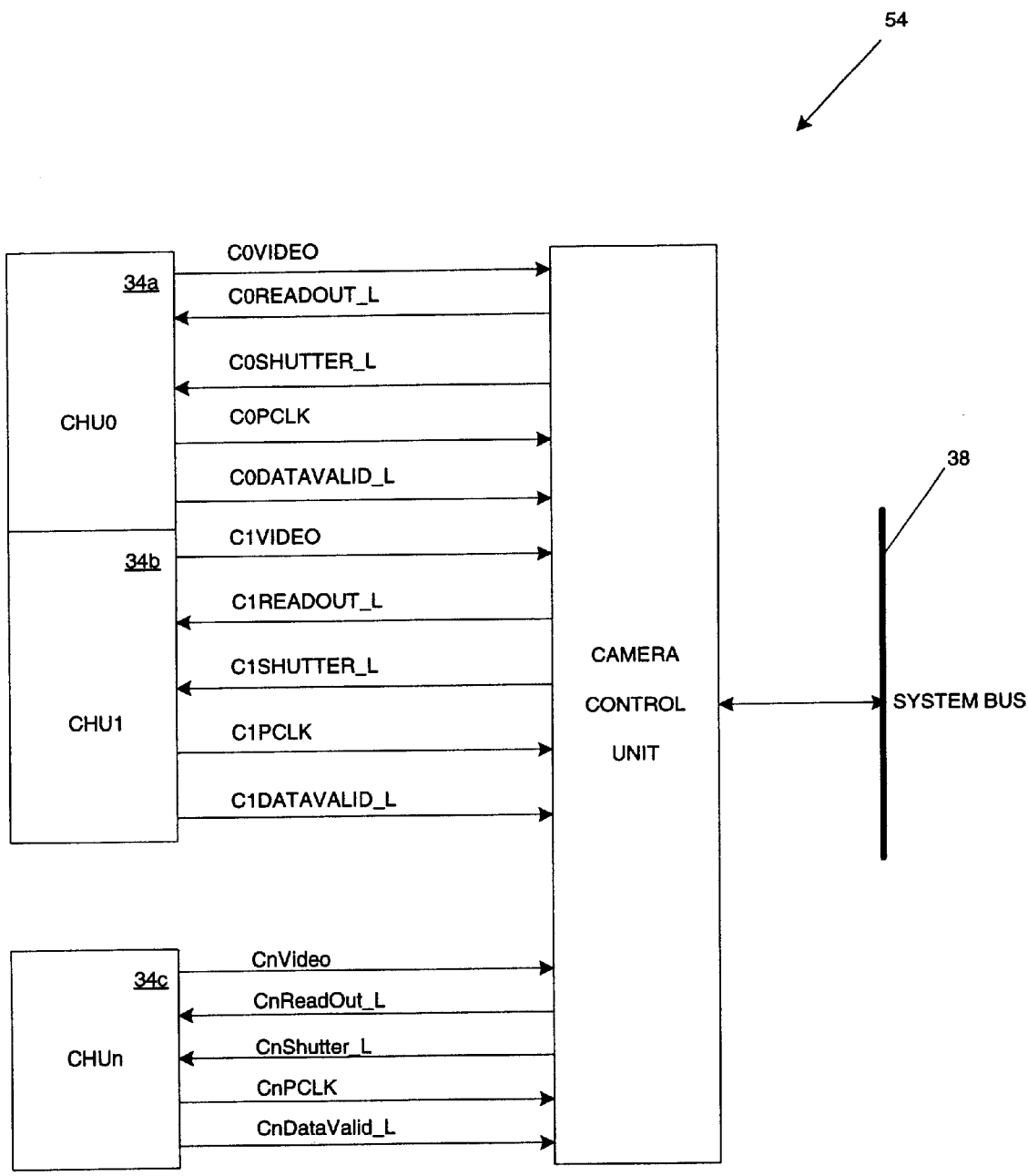
FIG. 6 depicts an image acquisition apparatus according to the invention having multiple camera head units.

FIG. 6 shows an image acquisition system 54 according to the invention comprising multiple Camera Head Units CHU0, CHU1, . . . , CHUn and their associated Camera Control Unit (CCU) 36. The CHU's CHU0, CHU1, . . . , CHUn are constructed and operated identically to CHU 34, discussed above. CCU 36 operates as described above, albeit in a manner intended for controlling multiple CHU's.

As discussed above, CCU 36 acquires an image in response to requests received from the host via the System Bus 38. In addition to the simple image acquisition sequence described for the single camera head embodiments described earlier, the multihead embodiment of FIG. 6 supports synchronous and asynchronous shuttering.

Figure 7:
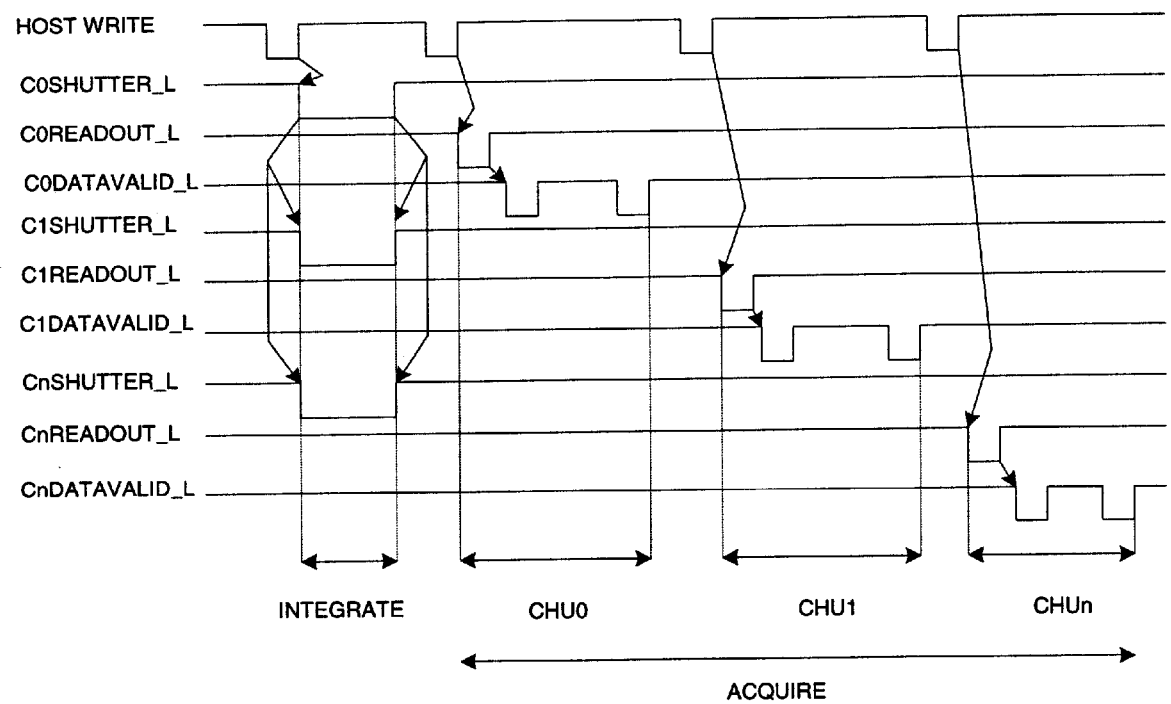
FIG. 7 depicts the timing of signal generation in an image acquisition of the type shown in FIG. 6 that acquires multiple images synchronously.

The synchronous shutter mode, illustrated in FIG. 7, allows multiple Camera Head Units (CHUs) to start their integration cycles at precisely the same time based upon a single write cycle from the host computer. This mode allows a system requiring multiple views of the same object to precisely control the operation of multiple cameras, resulting in images which are different views of the same object at a single moment in time. An alternative use of this mode could include operating multiple cameras in parallel so that each could capture an image of a different object in parallel, potentially increasing the efficiency of the inspection system.

Referring to FIG. 7 multiple shutter pulses (C0 Shutter_L . . . Cn Shutter_L) resulting from a single write cycle from the host computer communicating with the Camera Control Unit (CCU) 36 via the System Bus 38. The widths of the shutter pulses, and hence the integration time for each camera, may be identical or of varying lengths, depending upon the illumination conditions for each Camera Head Unit CHU0–CHUn.

Following the completion of the shutter interval, the image stored in each CCD is then transferred to the host computer via the System Bus 38 under the control of the Camera Control Unit (CCU) 36. More particularly, the host requests an image by instructing the Camera Control Unit (CCU) 36 to assert the readout pulse (C0 Readout . . . Cn Readout_L) for the next image requiring analysis. Since the host initiates the readout process, the order in which images are transferred from the Camera Head Units CHU0–CHUn is under host control and need not necessarily be in any particular order nor need it be fixed from one set of acquires to the next.

Each readout pulse (C0 Readout_L . . . Cn Readout_L) causes the CCD Timing Generator 42 located in the corresponding Camera Head Unit CHU0–CHUn to commence the sequence of vertical and horizontal clock cycles required to completely transfer the image residing in the readout cells of the corresponding CCD to the Camera Control Unit 36, where it is digitized and passed along to the host computer via the System Bus 38. The data validation signals (C0 DataValid_L . . . Cn DataValid_L in this example) are issued by the Camera Head Units CHU0–CHUn and are used by the Camera Control Unit 36 to distinguish between valid and invalid portions of the video signals transmitted from each CHU. The pixel clock generated by each Camera Head Unit, CHU0–CHUn, ensures that the video signal is sampled at its optimum point to maximize the accuracy of the digitalization process. The correct video and pixel clock signal are selected via the CHUSEL (Camera Head Unit SELect) signals within the Camera Control Unit (CCU, refer to FIG. 4).

Figure 8:
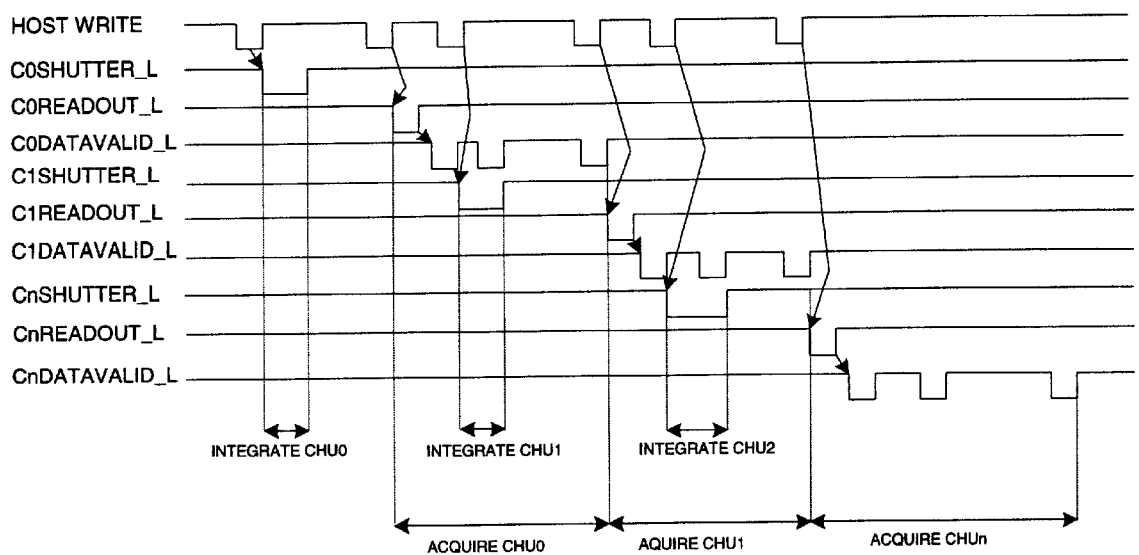
FIG. 8 depicts the timing of signal generation in an image acquisition of the type shown in FIG. 6 that acquires multiple images asynchronously.

With reference to FIG. 8, the asynchronous shutter operation of involving multiple Camera Head Units CHU0–CHUn is shown. This mode allows a single Camera Control Unit 36 to control two or more Camera Head Units in a completely independent manner. The net effect is that each Camera Head Unit CHU0–CHUn is operating as though it were attached to its own dedicated Camera Control Unit (CCU) 36.

In the illustration, the host initiates integration and readout cycles for each Camera Head Unit (CHU) by writing the appropriate commands to the Camera Control Unit (CCU) 36, via the System Bus 38. The CCU 36, in turn, issues the necessary shutter (C0 Shutter_L . . . Cn Shutter_L) and readout (C0 Readout_L . . . Cn Readout_L) pulses. Since the CHUs are operating autonomously, the shutter operation for one CHU may overlap with the shutter or readout operations of the other CHUs, as illustrated in FIG. 8.

As with the synchronous shutter mode, the host computer has complete control over the sequence of shutter and readout cycles for each Camera Head Unit CHU0–CHUn via the Camera Control Unit (CCU) 36. The host, accordingly, determines the order and frequency with which images are acquired from any particular Camera Head Unit CHU0–CHUn.

To this end, each readout pulse (C0 Readout_L . . . Cn Readout_L) causes the CCD Timing Generator located in the corresponding Camera Head Unit (CHU) to commence the sequence of vertical and horizontal clock cycles required to completely transfer the image residing in the readout cells to the Camera Control Unit (CCU) 36, where it is digitized and passed along to the host computer via the System Bus. The data validation signals (C0 DataValid_L . . . Cn DataValid_L in this example) are issued by the Camera Head Units (CHUs) and are used by the Camera Control Unit 36 to distinguish between valid and invalid portions of the video signals transmitted from each CHU. The pixel clock ensures that the video signal from each CHU is sampled at its optimum point to maximize the accuracy of the digitalization process. The correct video and pixel clock signal are selected via the CHUSEL (Camera Head Unit SELect) signals within the Camera Control Unit (CCU, refer to FIG. 4).

Described above are systems for image acquisition meeting the desired objects. Those skilled in the art will, of course, appreciate that the illustrated embodiments are merely examples of the invention and that embodiments incorporating modifications thereto fall within the scope of the invention. Thus, for example, it will be appreciated that the CCD configurations shown in FIGS. 1A–1B are merely examples of the configurations that may be used with the invention. By way of further example, it will be appreciated that the specific signals generated and used within the illustrated embodiment are but examples of those that may be used in operation of systems according to the invention. In view of the foregoing,

What I claim is:

1. An image acquisition apparatus comprising:
    A. a charge coupled device including a photosensitive region having one or more photosensitive charge collection sites, a non-photosensitive region having one or more non-photosensitive readout sites, the readout sites being coupled any of directly and indirectly to corresponding charge collection sites, the photosensitive region responding to an applied transfer signal for moving charges accumulated on the charge collection sites to corresponding non-photosensitive readout sites, the non-photosensitive region responding to a read signal applied independently of the transfer signal for outputting charges from the readout sites,
    B. a head unit, coupled to the charge coupled device, that generates an image signal based on charges output from the readout sites.

2. An image acquisition apparatus according to claim 1, comprising
    A. a control unit that responds to requests from a host by generating and applying to the head unit signals for acquiring an image, and
    B. the head unit responding to signals applied thereto by the control unit for applying to the charge coupled device (i) the transfer signal for moving charges accumulated on the charge collection sites to corresponding readout sites, and (ii) the read signal causing charges to be output from the readout sites.

3. An image acquisition apparatus according to claim 2, wherein the control unit generates and applies to the head unit at least one of (i) a shutter pulse defining at least a duration of charge integration by the charge coupled device, and (ii) a readout signal that effects output of charges from the readout sites.

4. An image acquisition apparatus according to claim 3, wherein the head unit responds to the shutter pulse for applying to the charge coupled device a reset signal for clearing the charge collection sites and for applying to the charge coupled device the transfer signal for causing charges accumulated on those sites to be transferred to the readout sites so as to effect an integration period having the duration in accord with that defined by the shutter pulse.

5. An image acquisition apparatus according to claim 4, wherein the head unit applies the read signal to the charge coupled device subsequent to application of the transfer signal so as to effect output to the head unit of charges in the readout sites.

6. An image acquisition apparatus according to claim 2, wherein the control unit includes a video path that conditions the image signal received from the head unit.

7. An image acquisition apparatus according to claim 6, wherein the video path includes a gain adjustment element that any of (i) adjusts a gain of the image signal received from the head unit, and (ii) increases an amplitude of that image signal.

8. An image acquisition apparatus according to claim 6, wherein video path includes a level correction element that eliminates residual offsets in the image signal received from the head unit.

9. An image acquisition apparatus according to claim 1, comprising
    A. a control unit that responds to a request from a host by generating and applying to the head unit (i) a shutter pulse defining at least a duration of charge integration by the charge coupled device, and (ii) a readout signal that effects output of charges from the readout sites, B. the head unit responding to the shutter pulse for applying to the charge coupled device a reset signal for clearing the charge collection sites and for applying to the charge coupled device the transfer signal for causing charges accumulated on those sites to be transferred to the readout site, C. the head unit responding to the readout signal applied thereto by the control unit for applying the read signal to the charge coupled device for effecting output of charges in the readout sites, and D. the control unit including a video path that conditions the image signal generated by the head unit from charges output from the readout sites.

10. An image acquisition apparatus according to claim 9, wherein the video path includes
   i) a gain adjustment element that any of (a) adjusts gain of the image signal received from the head unit, and (b) increases an amplitude of that image signal, and
   ii) a level correction element that any of eliminates residual offsets in an image signal received from the head unit.

11. An image acquisition apparatus comprising:
   A. a plurality of head units, each including a charge coupled device, and each that generates an image signal from charges output from readout sites of the respective charge coupled device,
   B. each charge coupled device including a photosensitive region having one or more photosensitive charge collection sites, a non-photosensitive region having one or more non-photosensitive readout sites, the readout sites being coupled to corresponding charge collection sites, the photosensitive region responding to an applied transfer signal for moving charges accumulated on the charge collection sites to corresponding non-photosensitive readout sites, the non-photosensitive region responding to a read signal applied independently of the transfer signal for outputting the charges from the readout sites, and
   C. a control unit, that is coupled to the plurality of head units, selectively generates and applies to each head unit signals for acquiring an image.

12. An image acquisition apparatus according to claim 11, wherein the control unit generates and applies to each head unit at least one of (i) a shutter pulse defining at least a duration of charge integration by the respective charge coupled device, and (ii) a readout signal that effects output of charges from the respective readout sites.

13. An image acquisition apparatus according to claim 12, wherein each head unit responds to the shutter pulse for applying to the respective charge coupled device a reset signal for clearing the charge collection sites and for applying to the respective charge coupled device the transfer signal for causing charges accumulated on those sites to be transferred to the readout sites.

14. An image acquisition apparatus according to claim 13, wherein each head unit applies the transfer signal to the respective charge coupled device subsequent to its application of the reset signal to that charged coupled device so as to effect an integration period having the duration in accord with that defined by the shutter pulse applied by the control unit to that head unit.

15. An image acquisition apparatus according to claim 11, wherein the control unit includes a video path that conditions image signals generated by the head units.

16. An image acquisition apparatus according to claim 15, wherein the video path includes
   i) a gain adjustment element that any of (a) adjusts gain of the image signal received from the head units, and (b) increases an amplitude of that image signal, and
   ii) a level correction element that any of eliminates residual offsets in the image signal received from the head units.

17. An image acquisition system according to claim 11, wherein the control unit has a synchronous mode of operation wherein it applies a shutter pulse signal substantially concurrently to the plurality of head units, and an asynchronous mode of operation wherein it applies a shutter pulse signal to the plurality of head units at substantially different respective times.

18. An image acquisition system according to claim 17, wherein the control unit applies a readout signal to the plurality of head units at substantially different respective times.

19. An image acquisition system according to any of claims 17–18, wherein the control unit applies the shutter pulse signal and the readout signal to the plurality of head units in accord with one or more requests received from a host.

20. A method of image acquisition using a charge coupled device of the type having
   i. a photosensitive region having one or more photosensitive charge collection sites,
   ii. a non-photosensitive region having one or more non-photosensitive readout sites, the non-photosensitive readout sites being coupled to corresponding photosensitive charge collection sites,
the method comprising the steps of
   A. responding to an applied transfer signal for moving charges accumulated on the charge collection sites to corresponding readout sites, and
   B. responding to a read signal applied independently of the transfer signal for outputting the charges in the non-photosensitive readout sites.

21. A method according to claim 20, comprising the step of responding to an applied reset signal for clearing charges on the charge collection sites.

22. A method according to claim 20, comprising the step of utilizing a head unit to generate an image signal based on charges output from the readout sites.

23. A method according to claim 22, comprising the steps of
   A. utilizing a control unit to generate and apply to the head unit signals for acquiring an image, and
   B. responding, with the head unit, to signals applied thereto by the control unit for applying to the charge coupled device (i) the transfer signal for moving charges accumulated on the charge collection sites to corresponding readout sites, and (ii) the read signal causing charges to be output from the readout sites.

24. A method according to claim 23, comprising the step of utilizing the control unit to generate and apply to the head unit at least one of (i) a shutter pulse defining at least a duration of charge integration by the charge coupled device, and (ii) a readout signal that effects output of charges from the readout sites.

25. A method according to claim 24, comprising the step of responding, with the head unit, to the shutter pulse for applying to the charge coupled device a reset signal for clearing the charge collection sites and for applying to the charge coupled device the transfer signal for causing charges accumulated on those sites to be transferred to the readout sites.

26. A method according to claim 25, comprising the step of utilizing the head unit to apply the transfer signal to the charge coupled device subsequent to application of the reset signal so as to effect an integration period having the duration in accord with that defined by the shutter pulse.

27. A method according to claim 26, comprising the step of utilizing the control unit to condition the image signal generated by the head unit.

28. A method according to claim 20, comprising the step of utilizing a plurality of head units, each coupled to a respective charge coupled device to generate an image signal based on charges output from readout sites thereof.

29. A method according to claim 28, comprising the step of utilizing a control unit to selectively generate and apply to each head unit a signal for acquiring an image.

30. A method according to claim 29, comprising the step of utilizing the control unit to generate and apply to each head unit at least one of (i) a shutter pulse defining at least a duration of charge integration by the respective charge coupled device, and (ii) a readout signal that effects output of charges from the respective readout sites.

31. A method according to claim 30, comprising the step of utilizing each head unit to respond to an applied shutter pulse for applying to the respective charge coupled device a reset signal for clearing the charge collection sites and for applying to the respective charge coupled device the transfer signal for causing charges accumulated on those sites to be transferred to the readout sites.

32. A method according to claim 30, comprising the step conditioning the image signals generated by the head units with a common video path.

33. A method according to claim 30, comprising the step of applying the shutter pulse substantially concurrently to each of the plurality of head units.

34. A method according to claim 30, comprising the step of applying the shutter pulse to each of the plurality of head units at substantially different respective times.

35. A method according to any of claims 33–34 comprising applying the readout signal to each of the plurality of head units at substantially different respective times.

* * * * *